United States Patent Office 3,197,495
Patented July 27, 1965

---

3,197,495
S-(10-PHENOXARSINYL) 2-PHENOXYETHYL XANTHATE
Stanley J. Strycker, Midland, Mich., assignor to The Dow Chemical Company, Midland, Mich., a corporation of Delaware
No Drawing. Filed Oct. 29, 1962, Ser. No. 233,905
1 Claim. (Cl. 260—440)

This invention is directed to the S-(10-phenoxarsinyl) ester of phenoxyethyl xanthic acid corresponding to the formula:

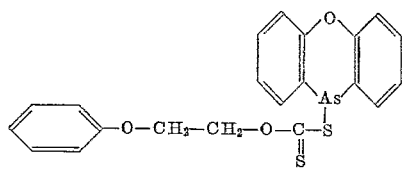

This compound is a crystalline solid material which is somewhat soluble in a number of common organic solvents and of very low solubility in water. The compound is useful as a pesticide for the control of a number of mite, insect, bacterial, fungal and plant species such as worms, beetles, aphids, tapeworms, nematodes and the organisms of rot and decay. Thus, it is adapted to be applied to plants, plant parts and their habitats for the modification and inhibition of the growth of aquatic, terrestrial and bacterial and fungal plants. Representative habitats include cutting oils, inks, glues, paper, textiles, wood, polymeric products, oil and latex paints and high energy fuels.

The new compound of the present invention can be prepared by reacting a 10-halophenoxarsine with an alkali metal salt of 2-phenoxyethyl xanthic acid. The reaction conveniently is carried out in a liquid material such as acetone, benzene, water or xylene. The exact amounts of the 10-halophenoxarsine and acid salt reagents to be employed are not critical, some of the desired product being obtained when employing any proportion of ingredients. In the preferred mode of operation, about one molecular proportion of a 10-halophenoxarsine is employed with one molecular proportion of the salt reagent and conveniently the sodium, potassium or ammonium salt. The reaction takes place smoothly at temperatures from 0° to 140° C. with the production of the desired product and alkali metal chloride of reaction. In carrying out the reaction, the 10-halophenoxarsine, such as the 10-chlorophenoxarsine or 10-bromophenoxarsine, and alkali metal salt of the acid are mixed and contacted together in any convenient fashion and maintained for a period of time at a temperature of from 0° to 140° C. to complete the reaction. Following the completion of the reaction, the desired product can be separated and purified by conventional procedures such as filtration, decantation, washing with water and recrystallization from common organic solvents.

In a representative operation, potassium 2-phenoxyethyl xanthate (30 grams; 0.12 mole) is added portionwise with stirring to 27.8 grams (0.10 mole) of 10-chlorophenoxarsine dispersed in 210 milliliters of benzene. The addition is carried out over a period of 20 minutes and at a temperature of from 20° to 30° C. Stirring is thereafter continued and the mixture maintained at a temperature of 30° C. for one hour to complete the reaction. The reaction mixture is then filtered and the solvent removed from the filtrate by evaporation under reduced pressure to obtain the S-(10-phenoxarsinyl) 2-phenoxyethyl xanthate product as a crystalline solid melting at 94.5°–96.5° C. and having a sulfur content of 7.5 percent.

The xanthate material employed as starting product in accordance with the present teachings can be prepared by reacting together (1) phenoxyethanol, (2) an alkali metal hydroxide, and (3) carbon disulfide. In carrying out the reaction, the phenoxyethanol and alkali metal hydroxide can be dispersed in an organic liquid as reaction medium and the carbon disulfide added thereto with stirring. Upon completion of the reaction, the desired alkali metal phenoxyethyl xanthate product can be separated from the reaction mixture by conventional methods.

The compound of the present invention is useful as a pesticide for the control of a number of insect and plant species. For such uses, the product can be dispersed on inert finely divided solids and employed as dusts. Such mixture also can be dispersed in water with or without the aid of surface active dispersing agents and employed as sprays. In other procedures, the product can be employed as an active constituent in inks, glues, oils, fuels, textiles, paper, wood, aqueous emulsions or dispersions and cooling tower and well flooding waters. In representative operations, aqueous compositions containing 500 parts per million by weight of S-(10-phenoxarsinyl) 2-phenoxyethyl xanthate give substantially complete controls of tomato late blight, Salvinia, green algae, southern army worms and the soil-dwelling organisms of root rot and decay.

What is claimed is:
S-(10-phenoxarsinyl) 2-phenoxyethyl xanthate.

References Cited by the Examiner
FOREIGN PATENTS
134,082. 12/60 Russia.

OTHER REFERENCES
Zhurnal Obschei Khimi, vol. 31, pages 845–849, March 1961.

TOBIAS E. LEVOW, *Primary Examiner.*